United States Patent [19]

Baumann

[11] Patent Number: 4,480,055
[45] Date of Patent: Oct. 30, 1984

[54] PROCESS FOR MANUFACTURING MODIFIED AMINO-RESIN PRODUCTS

[75] Inventor: Heinz Baumann, Kleinniedesheim, Fed. Rep. of Germany

[73] Assignee: Schaum-Chemie Wilhelm Bauer G.m.b.H. & Co. KG, Essen, Fed. Rep. of Germany

[21] Appl. No.: 352,721

[22] Filed: Feb. 26, 1982

[30] Foreign Application Priority Data

Mar. 5, 1981 [DE] Fed. Rep. of Germany ....... 3108279

[51] Int. Cl.³ ............................................. C08J 9/30
[52] U.S. Cl. ................................... 521/106; 521/121; 521/130; 521/180; 521/181; 521/187; 521/188; 528/144; 528/161; 528/164
[58] Field of Search ............... 521/188, 106, 121, 130, 521/180, 181, 187; 528/153, 164

[56] References Cited

U.S. PATENT DOCUMENTS 4,239,881 12/1980 Hasselman, Jr. ..................... 521/188
4,345,061 8/1982 Hasselman, Jr. ..................... 521/188

Primary Examiner—Morton Foelak
Attorney, Agent, or Firm—Sprung Horn Kramer & Woods

[57] ABSTRACT

Amino-resin products, which include aminoplast foams, can be modified by reacting an aminoplast precondensate, which contains an excess of formaldehyde or to which supplemental formaldehyde or another lower monoaldehyde or dialdehyde has been added before processing, with a hardening agent or with a solution of hardening agent, surfactant, and foamer in the presence of an additive that consists of one or more mononuclear or binuclear phenols, phenolic ethers, or acenaphthene derivatives with the overall formulas

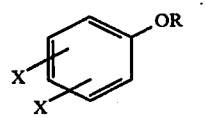

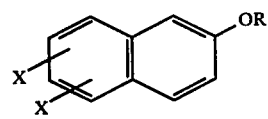

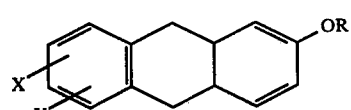

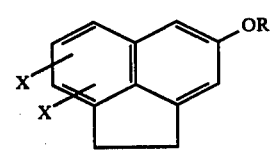

in which
X is H, OH, SO₃H, Cl, CH₃, or C₂H₅ and
R is H or an alkyl radical, with 1 to 9 carbon atoms, at a pH between about 1 and 2, mixed if necessary with aromatic sulphonic acids, at a pH between about 1 and 2. The modified products can be employed wherever free formaldehyde is undesirable.

8 Claims, No Drawings

PROCESS FOR MANUFACTURING MODIFIED AMINO-RESIN PRODUCTS

The invention is a process for manufacturing modified amino-resin products by converting an aminoplast precondensate.

Amino-resin products shall be understood to mean any products manufactured or processed by a method employing aminoplastic precondensates, such as wooden products like particle board, plywood, or fiberboard, etc. bonded or cemented with aminoplasts, textiles treated with amino resins, or other products like paper, casting sand, construction materials, etc. coated with amino resins, and, expecially, foam.

In many applications the formaldehyde odor that often occurs during or subsequent to processing is considered a drawback.

Although decreasing the content of formaldehyde has admittedly reduced the short-term odor problem, this solution will also result in extremely unstable products with extremely low mechanical properties that, as they decompose, will continue to release formaldehyde for quite a while, leading to the same odor problem over the long term. A number of investigations have been carried out in an attempt to eliminate this drawback.

Aminoplast foams based on urea-formaldehyde precondensates, the urea resins, have been known for quite a while. They are produced almost exclusively by a dispersion process in which two components are mixed into a foam. There are various appropriate methods.

It is possible to proceed in accordance with German Pat. No. 800 704 by converting a solution of foaming and hardening agents into an aqueous foam in a stationary agitator and jetting the resin into the container at an appropriate point. The finished product, a hardening liquid foam, is extracted continuously.

Easier to handle and therefore more practical are mobile foaming devices like that developed for the isofoam process (German Pat. No. 1 043 628). Here, an aqueous solution of hardener and surfactant is blown into a packing of glass beads to produce a fine foam into which the resin is jetted in a mixing chamber. This results in a liquid foam that can be conveyed to wherever it is to be employed through flexible tubing under the manometric pressure derived from the air component of the foam. It then hardens and dries. The aqueous solution of hardener and surfactant employed to produce a framework for the foam generally contains sodium dibutylnaphthalene sulfonate as a foaming agent and phosphoric acid as a hardener.

Only special precondensates with a high proportion of urea, with those disclosed in German Pat. No. 2 542 471, are appropriate for foam resins.

The liquid urea foam can also be obtained by a method described in Belgian Pat. No. 660 198 and Dutch Pat. No. 6 501 667 and similar to the isofoam process. Here, air is dispersed through a resin solution to which a compatible surfactant is added to form a resin foam, into which an acidic hardener solution is jetted to induce condensation and subsequent solidification.

Since the liquid foams produced in accordance with the method described have a large inner surface, they will dry rapidly as the result of evaporation and foam drainage. Admittedly, the weight of the fresh product will not become constant for several weeks because the physical drying process occurs simultaneously with a secondary condensation that takes a long time at room temperature. Still, once weight becomes constant, there will occur almost no more changes in the linear dimensions.

Notwithstanding considerable progress in condensation technology, the foams produced from urea-formaldehyde condensates alone continue to exhibit certain properties, like excessive shrinkage, formaldehyde release after hardening, slow establishment of equilibrium shrinkage, softening when subjected to humidity and heat, and a slow drying rate, that make them less useful.

The characteristics of urea foams can not be significantly improved by using particular devices, a special foaming apparatus for example, as in German Pat. No. 2 637 188. They can be improved with modifiers employed when the resin is manufactured or, more practically, processed into foam. Although a large number of additives have been suggested in the past, only a few can actually be employed to improve one or more of the properties of the foam that are considered unsatisfactory. The addition of polyhydric alcohols to urea resins mentioned in U.S. Pat. No. 1,054,232 and the admixture of polyethylene glycols of polymerization degrees 2–50 to increase flexibility and reduce shrinkage as in U.S. Pat. No. 2,807,595 have proven effective.

It is preferable to work the additives in so that they do not become activated until mixed. They must not in any way of course affect either the storage stability of the foam components or the properties of the final product.

Urea can be added to the resin later to decrease formaldehyde release. It is of course possible to obtain products that release somewhat less formaldehyde but are mechanically less stable and tend to crack as a result. Stable foams with a low formaldehyde content can on the other hand be obtained in accordance with U.S. Pat. No. 3,231,525 by dissolving the added urea in the aforementioned solution of hardener and foamer. They do not store very well, however.

Usually an additive will improve only one of the properties of a urea-formaldehyde foam that are considered undesirable, with of course other deficiencies showing up as a result that must be accepted in the bargain. Thus for example, foams that have been made shrink-resistant with polyethylene or polypropylene glycols will lose the very low flammability characteristic of unmodified urea-formaldehyde foams.

The invention is therefore intended as a process for manufacturing stable, especially hydrolysis-stable, amino-resin products that will release little formaldehyde, that will also exhibit, to the extent that they are foams, lower tendencies to crack, shrink, or burn and higher resistance to ambient humidity and heat, and that will dry faster.

The invention attains this objective by reacting an aminoplast precondensate, which contains an excess of formaldehyde or to which supplemental formaldehyde or another lower monoaldehyde or dialdehyde has been added before processing, with a hardening agent in the presence of an additive that consists of one or more mononuclear or binuclear phenols, phenolic ethers, or acenaphthene derivatives with the overall formulas

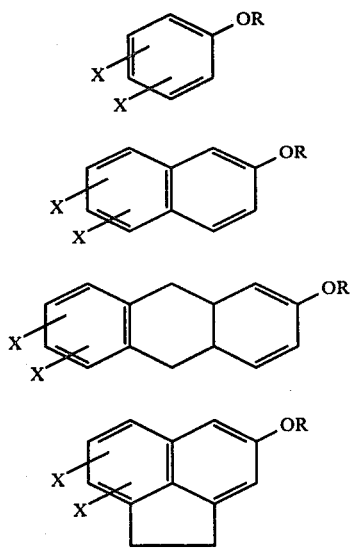

where X=H, OH, SO₃H, Cl, CH₃, or C₂H₅ and R=H or an alkyl residue with 1 to 9 carbon atoms, mixed if necessary with aromatic sulfonic acids with a pH between 1 and 2.

It has, surprisingly, been discovered that the amount of formaldehyde released from amino-resin products can be decreased without obtaining products that are unstable or that have a pronounced tendency to shrink or crack, not by reducing the concentration of formaldehyde in the resin, as has been previously attempted so often, but by employing an excess of formaldehyde or adding supplemental formaldehyde or another lower monoaldehyde or dialdehyde to the precondensate and using additives consisting of one or more of the above-mentioned mononuclear or binuclear phenols, phenolic ethers, or acenaphthene derivatives mixed if necessary with aromatic sulphonic acids along with the hardener or solution of hardener, surfactant and foamer. These additives bond the formaldehyde or supplemental aldehydes or both released in curing and existing in a free state in the resin by forming hydrolysis-stable co-condensates or networks that are linked together by carbon bonds and that penetrate the aminoplast condensate. The reaction products that form during curing are easy to identify by conventional methods.

Another surprise was that the invention makes it possible to improve a number of the other desirable properties of the aminoplast resins that it is used to manufacture.

0.05 to 0.3 mol/l of an aqueous solution of a short-chain monoaldehyde or dialdehyde like formaldehyde or glyoxal for example can be added to the aminoplast precondensate. Urea resins with a solids content of 30 to 60% are preferred.

The solution of hardener, surfactant, and foamer contains about 2 to 25% of a surface-active substance, preferably alkylated arylsulphonic acids, their salts, or alkylated aryl-polyglycol ether, and 5 to 30% of a low-corrosion inorganic or organic acid, phosphoric and/or formic or oxalic acid for example. Foam stabilizers like propylene glycol or higher alcohols can be added if necessary. It is practical to add from 0.01 to 0.5 mol/l of the previously mentioned additives to this foam solution.

Mixtures of the aromatics, combinations for example of dihydroxy or trihydroxy compounds like resorcinol, quinol, catechol, orcinol or pyrogallol, and phloroglucinol with salts of phenolsulfonic, toluenesulfonic, xylenesulfonic, 1,3-benzenesulfonic, or other aromatic sulfonic acids in a molar ratio of 1:1.6 to 1:2 and in concentrations of 0.01 to 3.0 mol/l of foam solution are preferred as additives.

In the manufacture of plastic foam, the aldehydes can also be added in the form of low-molecular condensates of sulfonic acids with formaldehyde, like condensates of naphthalenesulfonic acid and formaldehyde, if necessary.

For wood glues, the hardener and the additives can be mixed ahead of time and sprayed on or sprayed on separately in such a way as to mix. Likewise in the manufacture of plastic foam, the additives disclosed in the invention can be added in aqueous solutions immediately before foaming or introduced separately into the apparatus without detrimentally affecting the discovered advantages.

The effects attained by the invention can be improved even more with a postcure accelerator, with aliphatic saturated or unsaturated mono- or polycarboxylic acids like acetic, adipic, malonic, or maleic acid or with polyhydroxypolycarboxylic acids like citric acid, for example, in concentrations of between 0.1 and 0.3 mol/l of foam solution.

It has in fact been discovered that the foaming power of solutions that contain the additives in accordance with the invention will not be affected or will be affected very little even though their solids content is increased 1–2% above the usual level. Processing requires only that the pH be adjusted to between 1 to 2, preferably to 1.5±0.5, with phosphoric acid or another noncorrosive acid.

The combination of additives that has been discovered also allows salts, soluble phosphates, sulfates, and borates of divalent or trivalent metals to be dissolved in the foaming agent with no precipitation. Adding $MgSO_4$, $Al_2(SO_4)_3$, $KH_2PO_4$, $NaH_2PO_4$, or $Na_2B_4O_7$ will leave the solutions clear, and foaming power will not be diminished by coprecipitation of the foamer or by the formation of micelles. It is practical to add the salt only to the completely prepared solution to prevent any turbidity that may result from subsequent dosing with dihydroxy aromatics like resorcinol. Foam solutions with a higher content of solids will dry faster because of the lower amount of water introduced into the foam. The foams manufactured with such solutions will exhibit significantly lower flammability than state of the art foams as stated in German Pat. No. 1 054 232, and there will be less "free" formaldehyde in the product.

Foams manufactured in accordance with the invention can be used as insulation against heat and noise, as packaging materials, soil conditioners, flower-arrangement bases, oil absorption material, filters, and, when powdered, as filter aids or pharmaceutical powders.

In addition to the range of application for the other resin products described in the introduction, the apparel industry, in which it is especially important for products to contain no free formaldehyde or emit any formaldehyde odor, should also be mentioned.

The following examples, in which the weights are provided in terms of one liter of the solution of resin or foam, will illustrate the invention in greater detail.

PRECONDENSATE A 126 g of 37% formaldehyde was neutralized with 3M NaOH and treated with with 60 g of paraformaldehyde and 120 g of urea. The pH of the reaction mixture was adjusted to 8 with NaOH and heated over 30 minutes to 95° C., at which the pH dropped to from 6.8 to 7. The pH of 8 was restored by the addition of NaOH and the batch was heated for another 10 minutes. This precondensate corresponds to the condensate described in German Pat. No. 939 647.

PRECONDENSATE B

This condensate is a precondensate produced in an acidic solution with an excess of formaldehyde as in German Pat. No. 1 054 232.

EXAMPLE 1 (REFERENCE)

1 part by volume of an aqueous solution of Precondensate A with a solids content of 40 to 42% was foamed in an apparatus like that described in German Pat. No. 1 043 628 with 1.7 parts by volume of a foam solution of hardener and surfactant consisting of 24.5 parts by weight of the sodium salt of dibutylnaphthalenesulfonic acid and 28 parts by weight of phosphoric acid (concentration of 44.2% as $P_2O_5$). The resulting liquid foam was immediately foamed into a molding box measuring $50\times50\times4$ cm and into a box mold measuring $40\times40\times62.5$. The shallower mold was pulled off and the foam dried at 23° C. and 50% relative humidity until weight was constant. The other specimen was removed from the deeper mold, divided, and dried under the same atmospheric conditions. The formaldehyde content of the foam was immediately determined with an instrument manufactured by Lion Laboratories, Cardiff. A sample was removed from the dried constant-weight block and treated for 3 hours at 80° C. and 100% relative humidity. This sample was dried again to weight constancy and evaluated for weight loss and shrinkage. Combustion properties were tested as prescribed in DIN 4102 by subjecting the edges of a sample of constant-weight foam measuring $19\times9\times5$ cm to flame.

The resulting liquid foam had a bulk density of 46 g/l corresponding to a dry-weight of 12.6 g/l at weight constancy. Further details will be evident from the table.

EXAMPLE 2 (REFERENCE)

The procedure described in Example 1 was followed using Precondensate B.

The resulting liquid foam had a bulk density of 44 g/l corresponding to a dry-weight of 11 g/l at weight constancy. Further details will be evident from the table.

EXAMPLES 3 AND 4

The procedure described in Examples 1 and 2 was followed except that an aqueous solution of glyoxal was added to the solutions of Precondensates A and B in an amount of 0.08 mol of glyoxal per liter of Precondensate solutions. 0.05 mol of the sodium salt of benzenedisulfonic acid and 0.04 mol of resorcinol per liter were also added to the foam solution. The batch was processed at a pH of 1.48. As will be evident from the data in the table, the content of free formaldehyde was decreased in each case.

These examples also demonstrate that dimensional stability under the effects of simultaneous heat and humidity was greatly improved, whereas the unmodified foam was extremely plastic and subject to shrinkage without having noticeably decomposed.

EXAMPLES 5 AND 6

The procedure described in Example 2 was followed except that 0.25 mol of formaldehyde per liter of resin solution was added to Precondensate B in each case. The foam solution contained the following proportions of modifiers per liter:

|  | Example 5 | | Example 6 |
|---|---|---|---|
| Sodium salt of benzenedisulfonic acid | 0.32 mol | | 0.07 mol |
| Resorcinol | 0.5 | | 0.5 |
| Malonic acid | 0.38 | Oxalic acid | 0.24 |
| Phosphoric acid (to adjust pH) | 50 ml | | 50 ml of 85% |

As will be evident from the table, resistance to the influences of ambient heat and humidity was increased and linear shrinkage and the concentration of formaldehyde in the foam decreased in both cases.

EXAMPLE 7

The procedure described in Example 2 was followed, meaning that Precondensate B was used with excess formaldehyde, except that 0.015 of citric acid, 0.015 mol of toluenesulfonic acid, 0.05 mol of resorcinol, and 0.11 mol of potassium dihydrogenphosphate per liter was added to the foam solution.

A clear solution was unaffected foaming power was obtained. As will be evident from the table, the finished dry foam was outstanding for its dimensional stability when subjected to heat and humidity, its low level of formaldehyde, and its low tendency to shrink.

EXAMPLE 8

The procedure described in Example 2 was followed except that 0.05 mol of resorcinol, 0.055 mol of ammonium pentaborate, and 3 ml of phosphoric acid (25% per liter of solution) were added to the foam solution. Foaming power was unaffected and the stability of the clear foam solution was excellent. The results will be evident from the table.

TABLE

|  | Ref. Expls. | | | | | | | |
|---|---|---|---|---|---|---|---|---|
|  | 1 | 2 | 3 | 4 | 5 | 6 | 7 | 8 |
| Curing temperature, °C. | 23 | 23 | 23 | 23 | 23 | 23 | 23 | 23 |
| Dry Bulk density, g/l | 12.6 | 11.2 | 10.8 | 11.5 | 10.6 | 11.2 | 10.8 | 11.0 |
| Time taken to dry to constant weight, days | 13 | 16 | 12 | 10 | 6 | 7 | 5 | 4 |
| Linear shrinkage, % | 6 | 3.2 | 2.8 | 2.5 | 3.1 | 3.0 | 2 | 2 |
| Shrinkage under hydrolysis stress, % by vol.* | 73 | 62 | 5 | 7 | 15 | 12 | 1.1 | 3.6 |
| Weight loss under hydrolysis treatment, % | 8 | 7.5 | 6.2 | 7.9 | 5 | 6.4 | 6 | 5.8 |
| Flame test | sat. | sat. | good | good | good | good | v.g. | v.g. |
| Formaldehyde | 5 | 6 | 4 | 5.5 | 1.5 | 1 | 1 | 1 |

Comparison of the product of Reference Example 1 with the foam of Example 8 shows a markedly lower combustibility for the Example 8 product.

The product of Example 8 undergoes far less shrinkage than that of Reference Example 1 when held at 80° C. in 100% relative humidity for 3 hours.

As the examples demonstrate, the properties of a foam modified in accordance with the invention will be improved as follows:

Linear shrinkage will be slighter once weight constancy is achieved.

The resulting co-condensate or the aminoplast that is supplementary penetrated by a hydrolysis-stable network will be more dimensionally resistant and more stable when subjected to ambient heat and humidity.

Foams of higher or lower density can be obtained.

Manufactured foams will harden and dry more rapidly.

Less formaldehyde will be released.

It will be understood that the specification and examples are illustrative but not limitative of the present invention and that other embodiments within the spirit and scope of the invention will suggest themselves to those skilled in the art.

I claim:

1. In the preparation of a foamed amino-resin by reacting an aminoplast precondensate with a hardener, and thereafter foaming, the improvement which comprises employing an aminoplast precondensate which contains an excess of formaldehyde or to which supplemental formaldehyde or another lower monoaldehyde or dialdehyde has been added in the absence of any additive selected from the group consisting of a mononuclear or binuclear phenol, phenolic ether, or acenaphthene derivative, thereafter hardening in the presence of a surfactant foamer, a compressor gas and at least one additive selected from the group consisting of a mononuclear or binuclear phenol, phenolic ether, or acenaphthene derivative of the formula

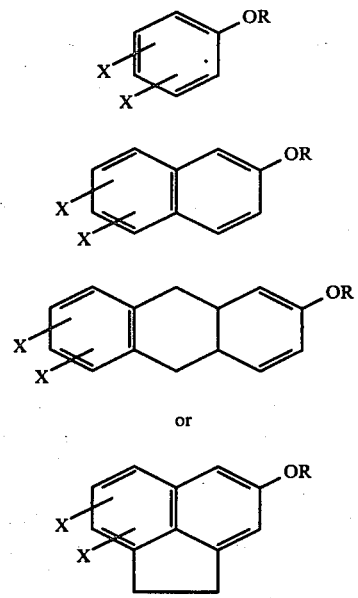

or in which
X is H, OH, SO$_3$H, Cl, CH$_3$, or C$_2$H$_5$ and
R is H or an alkyl radical, with 1 to 9 carbon atoms, at a pH between about 1 and 2, and releasing the pressure whereupon a foamed amino resin is produced.

2. A process according to claim 1, wherein a lower mono- or dialdehyde is added to the aminoplast precondensate in a concentration of about 0.05 to 0.3 mol/l of precondensate and in a molar ratio of about 1:1 to 1:3 of free aldehyde to additive.

3. A process according to claim 1, wherein the hardener comprises a low-corrosion inorganic or organic acid and is employed in a concentration of about 5 to 30% by weight of foamer solution.

4. A process according to claim 1, wherein the hardener comprises phosphoric, formic, or oxalic acid.

5. A process according to claim 1, wherein the additive is employed in a concentration of about 0.01 to 0.5 mol/l of foamer solution.

6. A process according to claim 5, wherein the surfactant comprises an alkylated arylsulfonic acid or salt thereof or an alkylated arylpolyglycol ether.

7. A process according to claim 6, wherein the foamer contains the surfactant in a concentration of about 2 to 25%.

8. A process according to claim 5, wherein the foamer contains about 0.01 to 0.2 mol/l of an aliphatic dicarboxylic acid or hydroxypolycarboxylic acid as a postcure acceleration.

* * * * *